United States Patent
Yang et al.

(10) Patent No.: US 7,466,569 B2
(45) Date of Patent: Dec. 16, 2008

(54) POWER CONVERTER HAVING PHASE LOCK CIRCUIT FOR QUASI-RESONANT SOFT SWITCHING

(75) Inventors: Ta-Yung Yang, Milpitas, CA (US); Rui-Hong Lu, Shueishang Township, Chiayi County (TW); Chuh-Ching Li, Jhongli (TW); Feng-Cheng Tsao, Linbian Township, Pingtung County (TW); Tso-Min Chen, Taichung (TW)

(73) Assignee: System General Corporation, Taipei Hsien (TW)

(*) Notice: Subject to any disclaimer, the term of this patent is extended or adjusted under 35 U.S.C. 154(b) by 391 days.

(21) Appl. No.: 11/274,125

(22) Filed: Nov. 16, 2005

(65) Prior Publication Data
US 2007/0109820 A1     May 17, 2007

(51) Int. Cl.
*H02M 3/335*     (2006.01)
*G05F 1/40*     (2006.01)

(52) U.S. Cl. .................. 363/21.03; 363/21.15

(58) Field of Classification Search .......... 363/20, 363/21.01–21.03, 21.12, 21.13, 21.15–21.18, 363/55, 56.01, 56.09, 95, 97, 131; 323/268, 323/271, 282, 283, 285
See application file for complete search history.

(56) References Cited

U.S. PATENT DOCUMENTS

| | | | | |
|---|---|---|---|---|
| 4,535,399 | A * | 8/1985 | Szepesi | 363/41 |
| 5,602,465 | A * | 2/1997 | Clemente | 323/300 |
| 6,476,589 | B2 * | 11/2002 | Umminger et al. | 323/282 |
| 7,054,170 | B2 * | 5/2006 | Yang et al. | 363/21.18 |

* cited by examiner

*Primary Examiner*—Matthew V Nguyen
(74) *Attorney, Agent, or Firm*—Rosenberg, Klein & Lee

(57) ABSTRACT

The present invention provides a power converter having a phase lock circuit for quasi-resonant soft switching. The power converter includes a first circuit coupled to the feedback signal to generate a switching signal for switching a switching device and regulating the output of the power converter. A second circuit is coupled to an auxiliary winding of the transformer for generating a voltage signal in response to the voltage of the transformer. A phase lock circuit generates a control signal to enable the switching signal in accordance with the voltage signal. The switching signal further turns on the switching device in response to a valley voltage across the switching device.

15 Claims, 5 Drawing Sheets

POWER CONVERTER HAVING PHASE LOCK CIRCUIT FOR QUASI-RESONANT SOFT SWITCHING

BACKGROUND OF THE INVENTION

1. Field of the Invention

The present invention relates to a power converter, power supply and switching regulator, and more particularly, to a soft switching power converter, power supply and regulator.

2. Description of Related Art

Power converters are used to convert an unregulated power source to a regulated voltage or current source. The power converter normally includes a transformer having a primary winding and a secondary winding to provide the isolation. The switching device connected to the primary winding to control energy transferring from the primary winding to the secondary winding. The power converter operated at a high frequency allows a size and weight reduction. However, the switching behavior of the switching device generates the switching losses and electric-magnetic-interference (EMI). FIG. 1 shows a flyback power converter, and the waveforms are shown in FIG. 2. The switching device 20 is applied to switch a transformer 10 and is used to control the power delivered from the primary winding to the secondary winding of the transformer 10. The energy is stored into the transformer 10 when the switching device 20 is turned on. After the switching device 20 is switched off, the energy of the transformer 20 will be discharged to the output of the power converter through a rectifier 30. In the mean time, a reflected voltage VR is generated in the primary winding of the transformer 10 in accordance with the output voltage $V_O$ and the turn-ratio of the transformer 10. Therefore, the voltage $V_D$ across the switching device 20 is equal to the input voltage $V_{IN}$ plus the reflected voltage $V_R$ once the switching device 20 is turned off. The voltage $V_D$ indicates the energy stored in the parasitic capacitor 25 of the switching device 20 as well. After a discharge period $T_{DS}$, the energy of the transformer 10 is fully discharged, and the energy stored in the parasitic capacitor 25 will flow back to the input voltage $V_{IN}$ through the primary winding of the transformer 10. The parasitic capacitor 25 (capacitance $C_j$) and the primary winding inductor (inductance $L_P$) of the transformer 10 develop a resonant tank, its resonant frequency $f_R$ can be shown as equation (1), $$f_R = \frac{1}{2\pi\sqrt{L_p \times C_j}} \quad (1)$$

During the resonant, the energy of the parasitic capacitor 25 will deliver to the primary inductor of the transformer 10 back and forth. A delay time $T_q$ is defined "from the parasitic capacitor 25 starts to discharge" "to a valley voltage occurred on the voltage $V_D$". The delay time $T_q$ is the period of the quasi-resonant. It can be expressed as equation (2), $$T_q = \frac{1}{4 \times f_R} \quad (2)$$

If the switching device 20 can be turned on during the valley voltage across the switching device 20, which will achieve the soft switching to minimize the switching loss and EMI.

The object of the present invention is to develop a power converter that is able to reduce the EMI and improve the efficiency of the power converter through the soft switching.

SUMMARY OF THE INVENTION

A power converter having a phase lock circuit for quasi-resonant soft switching includes a transformer and a switching device connected to the input of the power converter. A first circuit is coupled to the feedback signal to generate a switching signal for controlling the switching device and regulating the output of the power converter. A second circuit is coupled to an auxiliary winding of the transformer to generate a voltage signal in accordance with the voltage of the transformer. The voltage signal is correlated to the voltage across the switching device. A phase lock circuit is developed to generate a control signal in accordance with the voltage signal. The control signal is further coupled to enable the switching signal in response to a valley voltage across the switching device. Therefore, the quasi-resonant soft switching for the power converter is achieved.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings.

DETAILED DESCRIPTION OF THE PREFERRED EMBODIMENT

Figure 1:
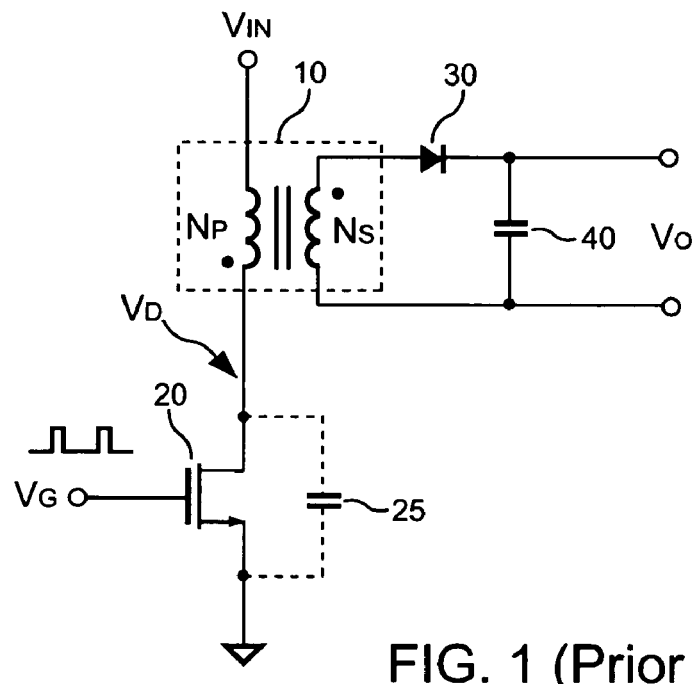
FIG. 1 shows a flyback power converter.
Figure 2:
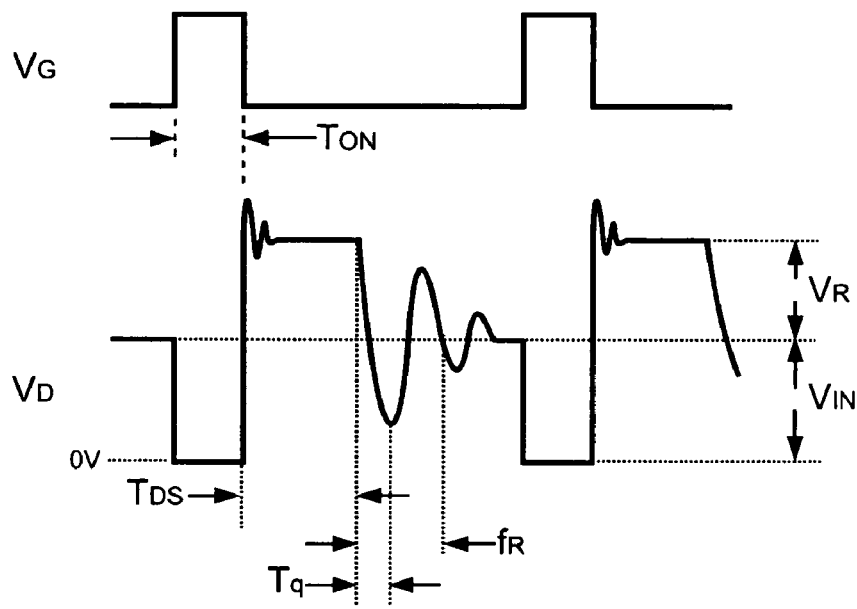
FIG. 2 shows the waveforms of the power converter in FIG. 1.
Figure 3:
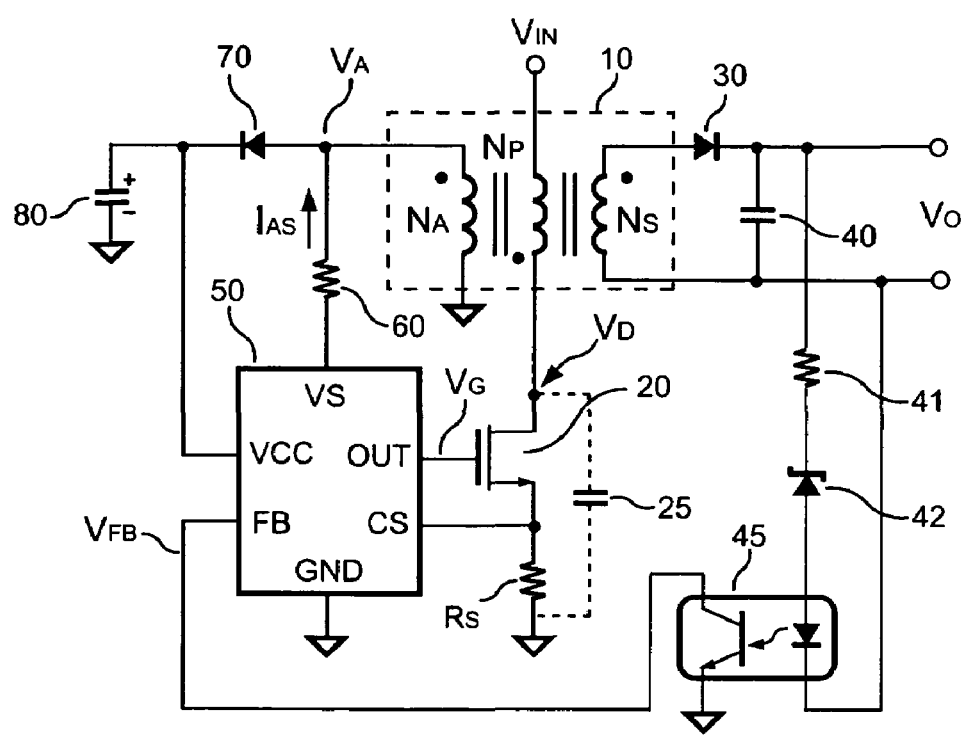
FIG. 3 is a preferred embodiment of a quasi-resonant power converter in accordance with the present invention.

FIG. 3 is a preferred embodiment of a power converter, in which a transformer (magnetic device) 10 is coupled to the input of the power converter. A switching device 20 is coupled to switch the transformer 10. A control circuit 50 includes a feedback terminal FB, a current sense terminal CS, an input terminal VS and an output terminal. The output terminal generates an output signal $V_G$ to drive the switching device 20. The switching device 20 is further coupled to switch the transformer 10 and generate a current signal on a current-sense resistor $R_S$. The transformer 10 comprises a primary winding $N_P$, a secondary winding $N_S$ and an auxiliary wind $N_A$. The primary winding $N_P$ is connected to the switching device 20. The secondary winding $N_S$ is coupled to the output of the power converter through the rectifier 30 and the output capacitor 40. The auxiliary wind $N_A$ provides the power source for the control circuit 50 through another rectifier 70 and a capacitor 80. A resistor 60 is further connected from the auxiliary winding $N_A$ to the input terminal VS. An optical coupler 45 is equipped to generate the feedback signal $V_{FB}$. The input of the optical coupler 45 is connected to the output of the power converter $V_O$ through a resistor 41 and voltage regulator 42. The feedback terminal FB is coupled to the feedback signal $V_{FB}$ for generating a switching signal $S_W$ and the output signal $V_G$ for regulating the output of the power converter $V_O$.

Figure 4:
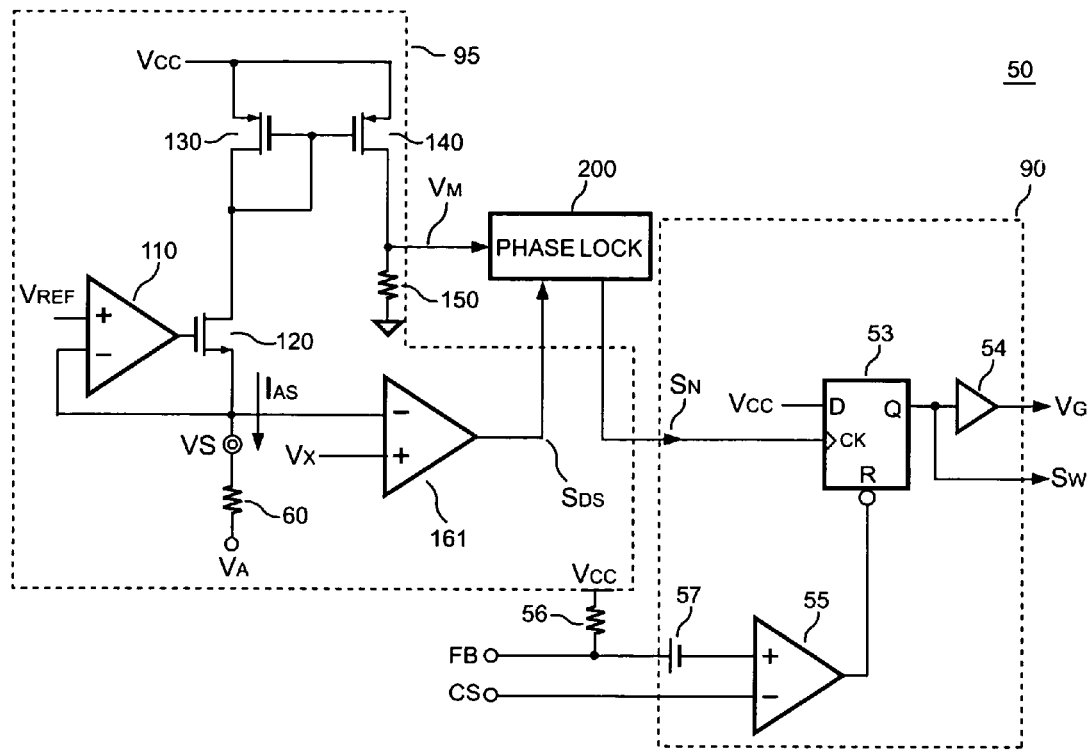
FIG. 4 is a circuit diagram of a control circuit in accordance with the present invention.

FIG. 4 is a circuit diagram of the control circuit 50 in accordance with the present invention. The control circuit 50 comprises a first circuit 90 coupled to the feedback signal $V_{FB}$ to generate a switching signal $S_W$ for controlling the switching device 20 and regulating the output of the power converter. A second circuit 95 is coupled to the auxiliary winding $N_A$ of the transformer 10 for generating a voltage signal $V_M$ in accordance with the voltage of the transformer 10. A phase lock circuit 200 is coupled to the voltage signal VM to generate a control signal SN for enabling the switching signal $S_W$ in response to a valley voltage across the switching device 20. The first circuit 90 includes a flip-flop 53, an output buffer 54, a comparator 55, a resistor 56 and an offset voltage 57. The resistor 56 is connected to the feedback terminal FB to pull the feedback signal $V_{FB}$ to a high level. The positive input of the comparator 55 is coupled to receive the feedback signal $V_{FB}$ through the offset voltage 57. The offset voltage 57 provides a level-shift for the feedback signal $V_{FB}$. The negative input of the comparator 55 is coupled to the current sense terminal CS to receive the current signal and achieve the PWM (pulse width modulation) control. The output of the comparator 55 is connected to reset the flip-flop 53. The flip-flop 53 generates the switching signal $S_W$ that is connected to the input of the output buffer 54. The output buffer 54 is further connected to the output terminal to generate the output signal $V_G$. The phase lock circuit 200 generating a control signal $S_N$ is connected to the flip-flop 53 to enable the switching signal $S_W$ in response to the voltage of the auxiliary winding $N_A$ of the transformer 10. The voltage of the auxiliary winding $N_A$ is proportional to the voltage across to the switching device 20. Therefore, through a phase lock operation, the switching device 20 can be turned on in response to the valley voltage across the switching device 20.

Figure 5:
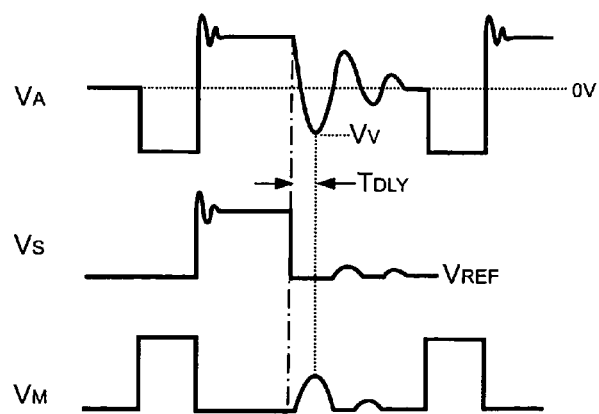
FIG. 5 shows the waveforms of the control circuit in FIG. 4.

The second circuit 95 includes an input circuit coupled to the auxiliary winding $N_A$ of the transformer 10 through the resistor 60. The input circuit is developed by an operational amplifier 110 and a transistor 120. The operational amplifier 110 has a positive input connected to a reference voltage $V_{REF}$. The negative input of the operational amplifier is coupled to the input terminal $V_S$. The output of the operational amplifier 110 controls the gate of the transistor 120. The source of the transistor 120 is connected to the input terminal VS. Therefore, the minimum voltage of the input terminal VS is regulated as the reference voltage $V_{REF}$. A current mirror circuit formed by transistors 130 and 140 is coupled to the input circuit to generate the voltage signal $V_M$ at the resistor 150 in response to a current flowed through the resistor 60. FIG. 5 shows the waveforms of the control circuit 50. The current $I_{140}$ of the transistor 140 is generated in response to a current $I_{AS}$ flowed through the resistor 60. The current I140 can thus be expressed as equation (3), $$I_{140} = I_{130} = \frac{V_{REF} - V_A}{R_{60}} \quad (3)$$

where $I_{130}$ is the current of the transistor 130; $R_{60}$ is the resistance of the resistor 60. $V_A$ is the voltage on the auxiliary winding $N_A$ of the transformer 10.

Figure 6A:
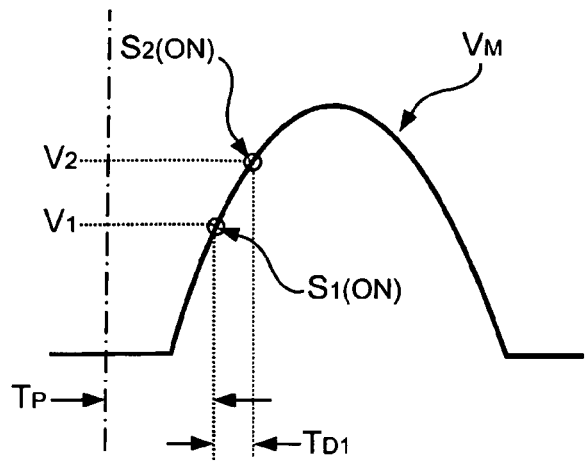
FIGS. 6A-6C show the waveform for phase locking the valley voltage.
Figure 6B:
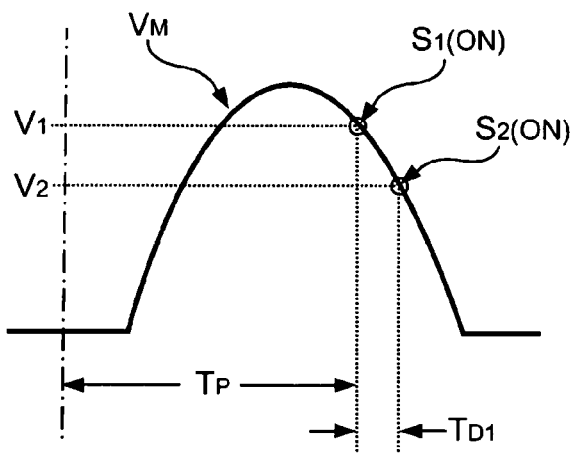
Figure 6C:
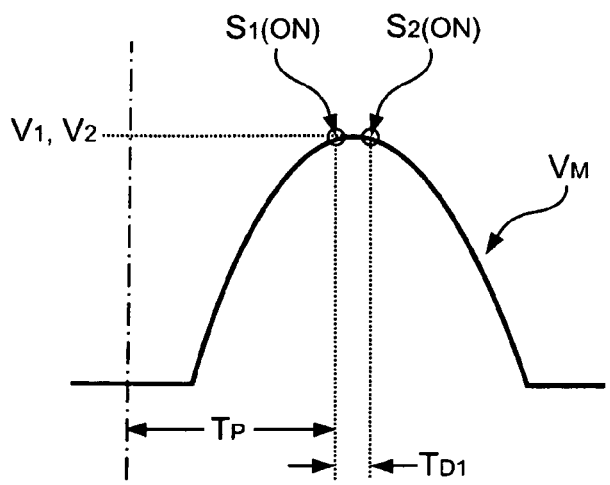

A waveform detector formed by a comparator 161 is coupled to the input circuit to produce a beginning signal $S_{DS}$ in accordance with the voltage $V_A$. The beginning signal $S_{DS}$ is developed to start the control signal $S_N$, and it is enabled once the voltage $V_A$ is lower than a threshold voltage $V_X$. The phase lock circuit 200 is coupled to the resistor 150 to generate the control signal $S_N$ in response to the peak value of the voltage signal $V_M$ and the beginning signal $S_{DS}$. The phase lock operation and the waveforms are shown in FIGS. 6A-6C. A first sample-signal $S_1$ and a second sample-signal $S_2$ sample a voltage $V_1$ and a voltage $V_2$ from the voltage signal $V_M$ respectively. The beginning signal $S_{DS}$ is utilized to initiate the first sample-signal $S_1$ after a programmable delay time $T_P$. A time delay $T_{D1}$ is incorporated between the first sample-signal $S_1$ and the second sample-signal $S_2$. The programmable delay time $T_{P1}$ will be increased as the voltage $V_2$ is higher than the voltage $V_1$. The programmable delay time $T_{P1}$ is decreased once the voltage $V_2$ is not higher than the voltage $V_1$. The first sample-signal $S_1$ is utilized to determine the enable of the switching signal $S_W$. The second sample-signal $S_2$ is correlated to the output signal $V_G$. Therefore, the switching device 20 can be turned on in response to the valley voltage.

Figure 7:
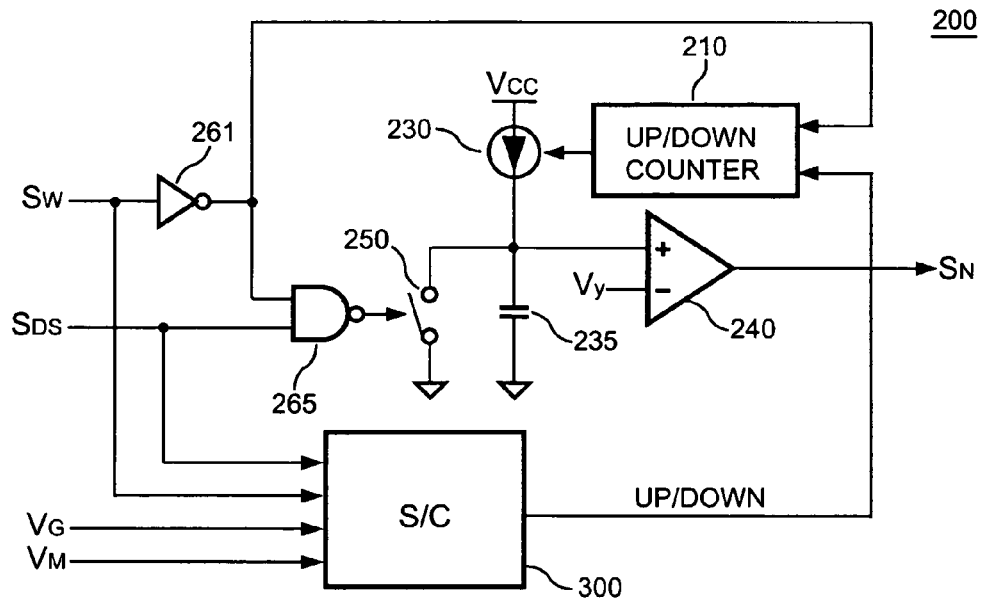
FIG. 7 is the circuit diagram of a phase lock circuit in accordance with the present invention.

The phase lock circuit 200 is shown in FIG. 7 in accordance with the present invention. It comprises a third circuit 300 generating an up/down signal in response to the beginning signal $S_{DS}$, the switching signal $S_W$ and the voltage signal $V_M$. An up/down counter 210 is used for generating counter-outputs in response to the on/off state of the switching signal $S_W$ and the up/down signal. A current source 230 and a capacitor 235 determine the programmable delay time $T_{P1}$ between the beginning signal $S_{DS}$ and the control signal $S_N$. The current of the current source 230 is generated in accordance with the counter-outputs of the up/down counter 210. The control signal $S_N$ is thus produced in response to the peak value of the voltage signal $V_M$. A delay control circuit is coupled to the current source 230 and the capacitor 235 to generate the control signal $S_N$. The delay-control circuit includes a comparator 240, a switch 250, an inverter 261 and an NAND gate 265. The first input of the NAND gate 265 is connected to the beginning signal $S_{DS}$. The second input of the NAND gate 265 is coupled to the switching signal $S_W$ via the inverter 261. The output of the NAND is coupled to control the on/off state of the switch 250. The switch 250 is applied to discharge the capacitor 235. The positive input of the comparator 240 is connected to the capacitor 235. A threshold voltage $V_Y$ supplies the negative input of the comparator 240. The comparator 240 outputs the control signal $S_N$ once the switch 250 is turned off and the voltage of the capacitor 235 is charged as higher than the threshold voltage $V_Y$.

Figure 8:
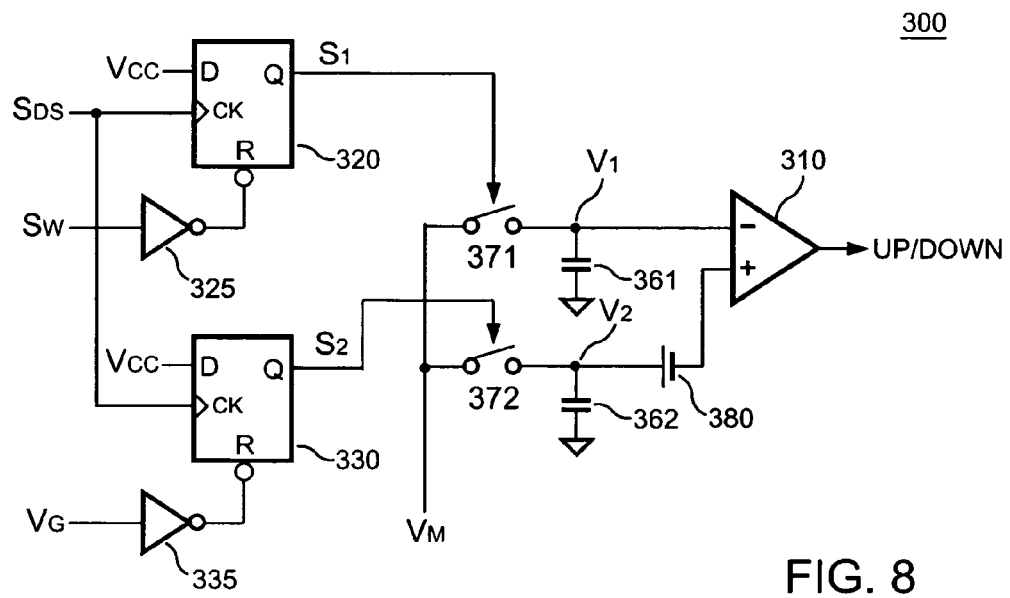
FIG. 8 shows the circuit diagram of a third circuit in accordance with the present invention.

FIG. 8 is the circuit diagram of the third circuit 300 that comprises a sample signal generator for producing a first sample signal $S_1$ and a second sample signal $S_2$. The Flip-flops 320, 330 and inverters 325, 335 form the sample signal generator. The beginning signal $S_{DS}$ is connected to the clock inputs of the flip-flops 320 and 330. The reset input of the flip-flop 320 is connected to switching signal $S_W$ through the inverter 325. The reset input of the flip-flop 330 is connected to the output signal $V_G$ through the inverter 335. Therefore, the first sample signal $S_1$ and the second sample signal $S_2$ are enabled in response to the beginning signal $S_{DS}$. The first sample signal $S_1$ is disabled once the switching signal $S_W$ is enabled. The second sample signal $S_2$ is disabled in response to the output signal $V_G$ of the output circuit is switched on. Therefore, the time delay $T_{D1}$ incorporated between the first sample-signal $S_1$ and the second sample-signal $S_2$ is determined by the propagation delay of the output circuit. A first capacitor 361 and a second capacitor 362 are used for generating the voltage $V_1$ and a voltage $V_2$. A first sample switch 371 is connected from the voltage signal $V_M$ to the first capacitor 361. The first sample switch 371 is controlled by the first sample signal $S_1$. A second sample switch 372 is connected from the voltage signal $V_M$ to the second capacitor 362. The second sample switch 372 is controlled by the second sample signal $S_2$. A comparator 310 having a negative input is connected to the first capacitor 361. The positive input of the comparator 310 is connected to the second capacitor 362 through an offset voltage 380. The comparator 310 therefore generates the up/down signal in accordance with the voltage $V_1$ and the voltage $V_2$. After that, the up/down signal is coupled to the up/down counter 210 to enable the up count once the switching signal $S_W$ is turned on before the valley voltage across the switching device 20. The up/down signal will enable the down count if the switching signal $S_W$ is turned on after the valley voltage across the switching device 20. The phase lock operation, as foregoing description, will achieve the soft switching for the switching device 20 and improve the efficiency for the power converter.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A power converter having a phase lock circuit for quasi-resonant soft switching comprising:
   a transformer, coupled to an input of the power converter;
   a switching device, coupled to switch the transformer;
   a first circuit, coupled to a feedback signal to generate a switching signal for controlling the switching device and regulating the output of the power converter;
   a second circuit coupled to an auxiliary winding of the transformer for generating a voltage signal in accordance with the voltage of the transformer;
   a phase lock circuit coupled to the voltage signal for generating a control signal to enable the switching signal in response to a valley voltage across the switching device.

2. The power converter having the phase lock circuit for quasi-resonant soft switching as claimed in claim 1, wherein the second circuit comprising:
   an input circuit, coupled to the auxiliary winding of the transformer through a resistor;
   a first resistor;
   a current mirror circuit, coupled the input circuit to generate the voltage signal at the first resistor in response to a current flowed through the resistor;
   a waveform detector, coupled to the input circuit to produce a beginning signal in accordance with the voltage of the transformer; wherein the beginning signal is developed to start the control signal.

3. The power converter having the phase lock circuit for quasi-resonant soft switching as claimed in claim 1, wherein the phase lock circuit comprising:
   a third circuit, generating an up/down signal in response to the beginning signal, the switching signal and the voltage signal;
   an up/down counter, generating counter-outputs in response to the on/off state of the switching signal and the up/down signal;
   a current source and a capacitor determining the delay time between the beginning signal and the control signal, wherein the current of the current source is generated in accordance with the counter-outputs; and
   a delay-control circuit, coupled to the current source and the capacitor to generate the control signal.

4. The power converter having the phase lock circuit for quasi-resonant soft switching as claimed in claim 3, wherein the third circuit comprising:
   a sample signal generator, producing a first sample signal and a second sample signal, and the first sample signal and the second sample signal are enabled in response to the beginning signal, wherein the first sample signal is disabled once the switching signal is enabled, and the second sample signal is disabled after the first sample signal is disabled;
   a first capacitor and a second capacitor for generating a first voltage and a second voltage;
   a first sample switch, connected from the voltage signal to the first capacitor, in which the first sample switch is controlled by the first sample signal;
   a second sample switch, connected from the voltage signal to the second capacitor, in which the second sample switch is controlled by the second sample signal; and
   a comparator having at least one input coupled to the first capacitor and the second capacitor for generating the up/down signal in accordance with the first voltage and the second voltage.

5. The power converter having the phase lock circuit for quasi-resonant soft switching as claimed in claim 3, wherein the up/down signal is coupled to the up/down counter to enable the up count if the switching signal is turned on before the valley voltage across the switching device, and the up/down signal is coupled to enable the down count of the up/down counter if the switching signal is turned on after the valley voltage across the switching device.

6. A power supply having a phase lock circuit for soft switching comprising:
   a first circuit, coupled to a feedback signal for generating a first signal to control a switching device coupled to a transformer and regulate an output of the power supply;
   a second circuit, coupled to a winding of the transformer to generate a second signal in accordance with a signal of the transformer; and
   a phase lock circuit coupled to the second signal for generating a control signal to enable the first signal in response to a valley voltage across the switching device.

7. The power supply having the phase lock circuit for soft switching as claimed in claim 6, wherein the second circuit comprising:
   an input circuit, coupled to the winding of the transformer through a resistor;
   a first resistor;
   a current mirror circuit, coupled to the input circuit to generate the second signal at the first resistor in response to a current flowed through the resistor; and
   a waveform detector coupled to the input circuit to produce a third signal in accordance with the signal of the transformer, wherein the third signal is developed to start the control signal.

8. The power supply having the phase lock circuit for soft switching as claimed in claim 6, wherein the phase lock circuit comprising:
   a third circuit generating an up/down signal in response to the first signal, the second signal and the third signal;
   an up/down counter generating outputs in response to the on/off state of the first signal and the up/down signal;
   a current source and a capacitor determining the delay time between the third signal and the control signal, wherein the current of the current source is generated in accordance with the outputs of the up/down counter; and a delay-control circuit coupled to the current source and the capacitor to generate the control signal.

9. The power supply having the phase lock circuit for soft switching as claimed in claim 8, wherein the third circuit comprising:
- a sample signal generator producing a first sample signal and a second sample signal, and the first sample signal and the second sample signal are enabled in response to the third signal, wherein the first sample signal is disabled once the first signal is enabled, and the second sample signal is disabled after the first sample signal is disabled;
- a first capacitor and a second capacitor for generating a first voltage and a second voltage;
- a first sample switch connected from the second signal to the first capacitor, in which the first sample switch is controlled by the first sample signal;
- a second sample switch connected from the second signal to the second capacitor, in which the second sample switch is controlled by the second sample signal; and
- a comparator having at least one input coupled to the first capacitor and the second capacitor for generating the up/down signal in accordance with the first voltage and the second voltage.

10. The power supply having the phase lock circuit for soft switching as claimed in claim 8, wherein the up/down signal is coupled to the up/down counter to enable the up count if the first signal is turned on before the valley voltage across the switching device, and the up/down signal is coupled to enable the down count of the up/down counter if the first signal is turned on after the valley voltage across the switching device.

11. A switching regulator having a phase lock circuit for soft switching comprising:
- a first circuit coupled to a feedback signal for generating a first signal to control a switching device coupled to a magnetic device and regulate the output of the switching regulator;
- a second circuit coupled to a winding of the magnetic device to generate a second signal in accordance with a signal of the magnetic device; and
- a phase lock circuit coupled to the second signal for generating a control signal to enable the first signal in response to a valley voltage across the switching device.

12. The switching regulator having the phase lock circuit for soft switching as claimed in claim 11, wherein the second circuit comprising:
- an input circuit coupled to the winding of the magnetic device to generate the second signal; and
- a waveform detector coupled to the input circuit to produce a third signal in accordance with the signal of the magnetic device, wherein the third signal is developed to start the control signal.

13. The switching regulator having the phase lock circuit for soft switching as claimed in claim 11, wherein the phase lock circuit comprising:
- a third circuit generating an up/down signal in response to the first signal, the second signal and the third signal;
- an up/down counter generating outputs in response to the on/off of the first signal and the up/down signal;
- a current source and a capacitor determining the delay time between the third signal and the control signal, wherein the current of the current source is generated in accordance with the outputs of the up/down counter; and
- a delay-control circuit coupled to the current source and the capacitor to generate the control signal.

14. The switching regulator having the phase lock circuit for soft switching as claimed in claim 13, wherein the third circuit comprising:
- a sample signal generator, producing a first sample signal and a second sample signal, and the first sample signal and the second sample signal are enabled in response to the third signal, wherein the first sample signal is disabled once the first signal is enabled, and the second sample signal is disabled after the first sample signal is disabled;
- a first capacitor and a second capacitor for generating a first voltage and a second voltage;
- a first sample switch, connected from the second signal to the first capacitor, in which the first sample switch is controlled by the first sample signal;
- a second sample switch connected from the second signal to the second capacitor, in which the second sample switch is controlled by the second sample signal; and
- a comparator having inputs coupled to the first capacitor and the second capacitor for generating the up/down signal in accordance with the first voltage and the second voltage.

15. The switching regulator having the phase lock circuit for soft switching as claimed in claim 13, wherein the up/down signal is coupled to the up/down counter to enable the up count if the first signal is turned on before the valley voltage across the switching device, and the up/down signal is coupled to enable the down count of the up/down counter if the first signal is turned on after the valley voltage across the switching device.

* * * * *